(12) United States Patent
Buzanowski

(10) Patent No.: US 8,715,399 B2
(45) Date of Patent: May 6, 2014

(54) PARTICULATE FILTERING WITH FILTER CARTRIDGES HAVING CYLINDRICAL SEGMENT SHAPES

(75) Inventor: Mark A. Buzanowski, Carrollton, TX (US)

(73) Assignee: Peerless Mfg. Co., Dallas, TX (US)

( * ) Notice: Subject to any disclaimer, the term of this patent is extended or adjusted under 35 U.S.C. 154(b) by 341 days.

(21) Appl. No.: 12/857,392

(22) Filed: Aug. 16, 2010

(65) Prior Publication Data

US 2012/0036817 A1 Feb. 16, 2012

(51) Int. Cl.
*B01D 46/00* (2006.01)

(52) U.S. Cl.
USPC .............. 95/286; 55/483; 55/484; 55/529

(58) Field of Classification Search
USPC ............ 29/402.03, 426.1; 55/282–288, 55/306–314, 338–340, 391–399, 410–417, 55/423–427, 466–473, 475–476, 478–481, 55/490–511, 521, 529, 350.1–382; 95/214–215, 268, 273, 277–287; 96/380–388, 396–429; 210/433.1–510.1
See application file for complete search history.

(56) References Cited

U.S. PATENT DOCUMENTS

| | | | | |
|---|---|---|---|---|
| 2,046,770 | A | | 7/1936 | Coberly et al. |
| 2,774,443 | A | * | 12/1956 | Slayter ............................ 55/379 |
| 3,330,101 | A | * | 7/1967 | Murphy, Jr. ..................... 55/484 |
| 3,362,138 | A | * | 1/1968 | Acker ............................ 55/341.1 |
| 3,853,509 | A | * | 12/1974 | Leliaert ........................ 55/341.1 |
| 4,613,438 | A | * | 9/1986 | DeGraffenreid ........... 210/323.1 |
| 4,715,954 | A | * | 12/1987 | DeGraffenreid ........... 210/323.1 |
| 4,749,485 | A | * | 6/1988 | DeGraffenreid ........... 210/323.1 |
| 5,074,896 | A | * | 12/1991 | Baert et al. .................. 55/341.6 |
| 5,223,008 | A | * | 6/1993 | Troxell ........................ 55/350.1 |
| 5,730,766 | A | * | 3/1998 | Clements ..................... 55/341.1 |
| 5,830,250 | A | | 11/1998 | Shirk et al. |

(Continued)

FOREIGN PATENT DOCUMENTS

GB 2 375 494 * 11/2002 ............. B01D 29/52

OTHER PUBLICATIONS

Buzanowski, Mac et al., "Minimizing the Pressure Drop Across Filters with Multi Cylindrical Filter Tubes," American Filtration and Separation Society Annual Conference, Filter Modeling Session, Mar. 26-29, 2007, Orlando, FL, 5 pages, AFS.

(Continued)

*Primary Examiner* — Duane Smith
*Assistant Examiner* — Sonji Turner
(74) *Attorney, Agent, or Firm* — Fulbright & Jaworski LLP

(57) ABSTRACT

A filter cartridge which includes a filter medium having a cylindrical segment shape and a channel disposed within the filter medium for receiving fluid filtered through the filter medium. A method of increasing a filter medium surface area of a filter or lowering pressure drop across the filter that has a plurality of filter cartridges disposed in a filter vessel. The method includes removing at least one filter cartridge from the filter vessel and replacing the removed filter cartridge with a filter cartridge that includes a filter medium having a cylindrical segment shape. The latter filter cartridge also includes a channel disposed within the filter medium for receiving fluid filtered through the filter medium.

20 Claims, 10 Drawing Sheets

(56) References Cited

U.S. PATENT DOCUMENTS

| | | | | |
|---|---|---|---|---|
| 5,935,284 | A | * | 8/1999 | Tokar et al. ..................... 55/485 |
| 6,056,796 | A | * | 5/2000 | Chiang et al. .................. 55/302 |
| 7,332,009 | B2 | * | 2/2008 | Casey et al. ..................... 55/423 |
| 7,419,525 | B2 | * | 9/2008 | Reamsnyder et al. .......... 55/484 |
| 7,572,311 | B2 | * | 8/2009 | Zuberi ............................ 55/523 |
| 7,611,764 | B2 | | 11/2009 | Komori et al. |
| 2002/0178921 | A1 | | 12/2002 | Kosmider et al. |
| 2005/0172590 | A1 | * | 8/2005 | Burns et al. ..................... 55/498 |
| 2006/0174598 | A1 | | 8/2006 | Mills et al. |
| 2008/0236119 | A1 | * | 10/2008 | Boland et al. .................. 55/482 |

OTHER PUBLICATIONS

Buzanowski, Mac et al., "Optimization of Multi Cylindrical Filters for Industrial Gas Processing Plants," Proceedings of the 5th Joint ASME/JSME Fluids Engineering Conference, Jul. 30-Aug. 2, 2007, San Diego, CA 3 pages, ASME.
U.S. Appl. No. 29/361,824, Buzanowski.
U.S. Appl. No. 29/361,825, Buzanowski.
U.S. Appl. No. 29/361,826, Buzanowski.
U.S. Appl. No. 29/361,828, Buzanowski et al.
International Search Report and Written Opinion issued for PCT/US2011/046133, dated Dec. 16, 2011, 7 pages.

* cited by examiner

PARTICULATE FILTERING WITH FILTER CARTRIDGES HAVING CYLINDRICAL SEGMENT SHAPES

CROSS-REFERENCE TO RELATED APPLICATIONS

This application is related to copending U.S. application Ser. No. 29/361,828, filed May 14, 2010 and entitled "FILTER CARTRIDGE ASSEMBLY," U.S. application Ser. No. 29/361,826, filed May 14, 2010 and entitled "FILTER CARTRIDGE," U.S. application Ser. No. 29/361,825, filed May 14, 2010 and entitled "FILTER CARTRIDGE," and U.S. application Ser. No. 29/361,824, filed May 14, 2010 and entitled "FILTER CARTRIDGE," the disclosures of which are incorporated herein by reference.

TECHNICAL FIELD

The present disclosure generally relates to filtration processes. Specifically, the disclosure relates to the use of filter cartridges having cylindrical segment shapes for optimizing the performance of gas filters.

BACKGROUND

Various industrial processes use, produce, or handle gas streams that contain solid particles. For example, chemical plants, pipeline stations, gasoline plants, power generation plants, refineries, and town border stations for distribution systems have gas streams that contain solid particles such as dust, dirt and scale. For several reasons, it may be desirable to remove the solid particles from the gas stream. At power plants, for example, dust collection equipment removes fly-ash and other pollutants from flue gases in order to control air pollution. At plants that have large engines, engine intake air is filtered to reduce the amount of particulate matter entering the engine, thus, reducing equipment maintenance and extending the overall life of the equipment. In metallurgical operations that generate siliceous and metallic dusts, dust collection equipment is also used to reduce health and safety hazards. As a final example, in industries, such as the pharmaceutical industry, product quality requirements may demand the removal of solids from a gas stream. These various industrial processes attempt to remove the solid particles from gas streams in a cost efficient manner. Typically, gas filters are used to remove such undesirable solids from the gas streams. One common type of gas filter includes a filter vessel with a multi-cylindrical filter cartridge assembly for capturing the undesirable solids.

In gas filter operation, the dirty gas enters the filter vessel through an inlet nozzle. The gas expands as it travels from a relatively smaller inlet nozzle into a larger filter vessel. Once in the filter vessel, the gas flows between the filter cartridges and through a porous filter material of the filter cartridge. Typically, the outer portion of the porous filter material is in a cylindrical configuration. The porous filter material includes materials such as woven cloth, felt or other porous membrane materials through which the gas passes but through which the solids will not pass. In other words, the solids are deposited on the filtration material. The filtered gas then flows through a hollow section of the cylindrical filter cartridges and exits the filter vessel through an outlet nozzle as clean gas. In some gas filters, the gas flows from the cylindrical filter cartridges through a standpipe before exiting the filter vessel.

The process of cleaning a gas stream by passing it through a gas filter affects the flow properties of the gas stream. Specifically, the gas filtration process causes the pressure of the gas to drop as the gas flows within the filter vessel. This pressure drop is typically a function of velocity. As velocity of a stream of gas increases its pressure losses also increase, and the overall pressure of the system drops. And, conversely, as the velocity of a stream of gas decreases, its pressure losses also decrease resulting in a smaller overall system pressure drop. Therefore, as the gas moves from the outer portions of the vessel and travels between the cylindrical filter cartridges, the gas contracts, its velocity increases and its pressure drops (contraction pressure drop). The smaller the open space between the cylindrical filter cartridges within the filter vessel, the higher the pressure drop will be because the velocity of the gas increases as the gas stream travels through the restricted space. The converse is also true; that is, the larger the open space between the cylindrical filter cartridges within the filter vessel, the lower the velocity and corresponding pressure drop will be. Thus, the pressure drop of the gas as it flows through the filter vessel may be minimized, for example, by increasing the proportion of open space in the filter vessel in relation to the space occupied by the filter cartridges, commensurate with the efficient operation of the underlying system.

As the gas passes through the filter media, a further pressure drop occurs (inertial pressure drop). If the surface area of the filter media is small, the gas velocity will be high (due to the restricted passage) and, thus, the pressure drop will also be high. Conversely, if the surface area of the filter media is larger, the gas velocity and corresponding pressure drop will be lower. Thus, to minimize the inertial pressure drop, it is advantageous to increase the surface area of the filter media to a particular point commensurate with the efficient operation of the underlying system.

After filtering through the filter cartridges, a further pressure drop occurs as the gas enters into more open space in the filter vessel. As the gas moves through the standpipes from the filter cartridges into more open space its pressure decrease and finally as the gas expands its velocity and corresponding pressure drop additionally decrease (expansion pressure drop). Thus, the pressure drop of the gas as it flows through the filter vessel may be minimized by increasing the standpipe opening area in relation to the open space in the filter vessel, commensurate with the efficient operation of the underlying system. It should be noted that typically the diameter of the standpipe increases with an increase in the diameter of a filter cartridge.

To summarize, the extent of the pressure drop of a gas as it travels through a filter vessel is a function of, among other parameters, the amount of open space in the filter vessel in relation to the space occupied by filter cartridges, the amount of open space in the filter vessel in relation to the standpipe opening area through which the gas travels and the total filter medium surface area of the filter cartridges. The total pressure drop experienced in a filter vessel may, therefore, be controlled by varying any one or a combination of the diameters of filter cartridges, the amount of filter cartridges, or changing the filter vessel diameter.

Historically, when designing gas filters for a particular process, the end user usually specifies the maximum allowable pressure drop that the filter should cause when the filter is installed in the process. Additionally, the end user may specify the minimum life expectancy of the filter cartridges during operation of the filter in the process. To meet these criteria, the filter provider historically used the smallest sized filter vessel densely packed with cylindrical filter cartridges to an extent that the filter provider believes might meet the end user's maximum allowable pressure drop and filter cartridge life requirements. If these requirements are not met initially, the filter provider would usually vary the original configuration of filter cartridges until the end user's requirements were achieved. For example, if the pressure drop is higher than what the end user requires, the filter provider may increase the diameter of the cylindrical filter cartridges, which reduces the overall number of filter cartridges within the filter vessel in order to achieve a lower pressure drop. Another way of increasing open space is to increase the filter vessel size. Increasing the filter vessel size, however, was not a favored procedure because the filter vessel is one of the more expensive components of a gas filter.

Over time, filter designers started focusing more on utilizing the smallest filter vessel size possible to achieve a given pressure drop because, as noted above, the filter vessel is one of the more expensive components of the gas filter. As a first step, the trial and error method noted above was replaced with more sophisticated methods of determining the optimal filter cartridge diameter to stay within a desired pressure drop for a given vessel size. These methods include calculations and/or simulations of the filter in service. For example, FIG. 10 shows a graph produced from data gathered in a filter optimization process. For a given filter vessel diameter "D", filter cartridges of diameter "d" are loaded into the filter vessel and the pressure drop "$\Delta P$" caused by the gas filter is measured. Alternatively, the pressure drop may be calculated based on the parameters of the gas filter configuration being examined. Filter cartridge diameter "d" is varied several times and a plot of pressure drop against filter diameter "d" produces curve "A." Point "B" on curve "A" is where the lowest pressure drop for filter vessel diameter "D" may be achieved. As such, filter diameter "$d_0$" is the optimal filter cartridge diameter that will provide the lowest pressure drop. The optimization process may be continued by reducing vessel diameter "D" and repeating the calculations or simulations to determine the optimal filter vessel diameter. Consequently, for an optimized pressure drop, the filter designer is able to specify with considerable accuracy what the optimal vessel diameter and optimal cylindrical filter cartridge diameter should be. There is a continuing need, however, to further optimize the performance of gas filters.

BRIEF SUMMARY

Embodiments of the present disclosure are directed to apparatus and methods for increasing a filter medium surface area of the apparatus without increasing the volume of space occupied by filter cartridges that provide the filter medium surface area within the filter. Representative embodiments of the present disclosure are directed to a filter cartridge including a filter body having a cylindrical segment shape. A channel is disposed within the filter body for receiving fluid filtered through the filter body.

Additional representative embodiments of the present disclosure are directed to a filter including a filter vessel that has an inlet nozzle and an outlet nozzle. The filter further includes a plurality of filter cartridges disposed within the filter vessel. The filter cartridges are in fluid communication with the inlet nozzle and outlet nozzle. At least one of the filter cartridges includes a filter body that has a cylindrical segment shape. The filter cartridge further includes a channel disposed within the filter body for receiving fluid filtered through the filter body.

Further representative embodiments of the present disclosure are directed to a method of increasing a filter medium surface area of a filter that has a plurality of filter cartridges disposed in a filter vessel. The method includes removing at least one filter cartridge from the filter vessel and replacing the removed filter cartridge with a filter cartridge that includes a filter body that has a cylindrical segment shape. The latter filter cartridge also includes a channel disposed within the filter body for receiving fluid filtered through the filter body.

Still further representative embodiments of the present disclosure are methods of reducing a total pressure drop across a filter that has a plurality of filter cartridges disposed in a filter vessel. The method includes removing at least one filter cartridge from the filter. The removed filter cartridge(s) is then replaced with at least one filter cartridge that includes a filter body that has a cylindrical segment shape and a channel disposed within the filter body for receiving fluid filtered through the filter body.

Still further representative embodiments of the present disclosure are methods of designing a filter. The methods include defining a maximum allowable pressure drop and a minimum filter medium surface area for the filter. The method further includes assuming a filter vessel diameter that is used for an initial optimization process. The initial optimization process is performed by varying a cylindrical filter cartridge diameter and gathering data that establishes an optimal cylindrical filter cartridge diameter to stay within the maximum allowable pressure drop and minimum filter medium surface area. The method may also include varying the filter vessel's diameter and gathering data to determine a minimum filter vessel diameter required to achieve an optimized pressure drop. The method may also include constructing the filter to have the optimal cylindrical filter cartridge diameter and the optimal filter vessel diameter. Further, the method also includes removing at least one cylindrical filter cartridge from the filter vessel and replacing the cylindrical cartridge in the filter vessel with a filter cartridge having a cylindrical segment shape.

The foregoing has outlined rather broadly the features and technical advantages of the present disclosure in order that the detailed description of the disclosure that follows may be better understood. Additional features and advantages of the disclosure will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Figure 1A:
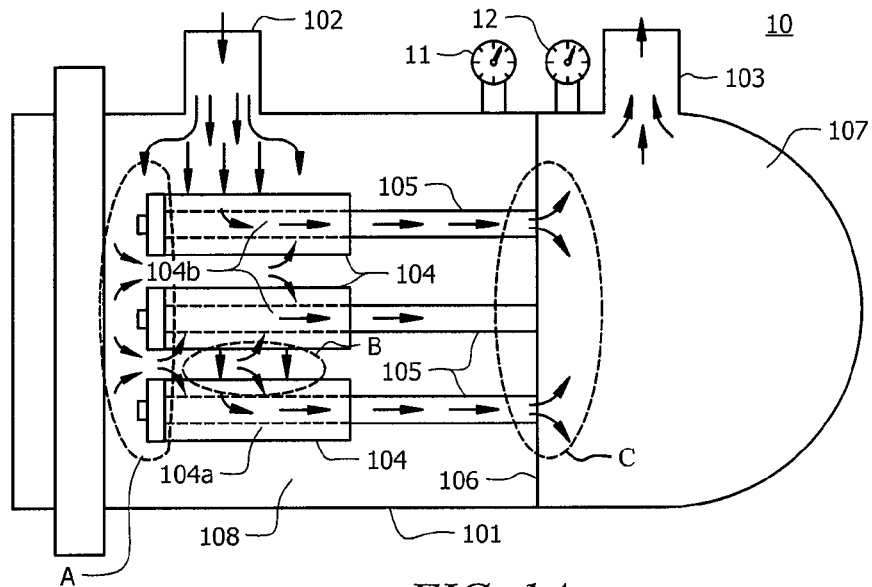
FIGS. 1A and 1B are diagrams illustrating an existing multi cartridge gas filter.
Figure 1B:
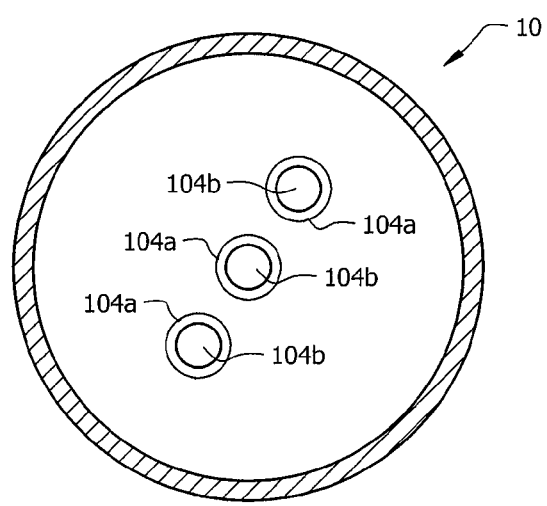

FIGS. 1A and 1B show a multi-cartridge gas filter 10. The filtration process involves dirty gas (gas containing unwanted particulate matter) entering cylindrical filter vessel 101 through inlet nozzle 102. As the gas enters filter vessel 101 through inlet nozzle 102, there is an expansion pressure drop. Conversely, as the gas leaves the vessel through outlet nozzle 103 there is a contraction pressure drop. These pressure drops, as the gas flows through the nozzles, are a function of the sizes of nozzles 102 and 103. Disposed within cylindrical filter vessel 101 are multiple hollow filter cartridges 104. After entering through inlet nozzle 102, the dirty gas flows through filter medium 104a of filter cartridges 104 (outside to inside). As the gas passes through filter medium 104a, the particulate matter from the gas is deposited on filter medium 104a. At the same time, the clean gas travels through channel 104b into standpipe 105. Plate 106 divides filter vessel 101 into dirty gas section 108 for dirty gas and clean gas section 107 for clean gas. Standpipe 105 carries the clean gas into clean gas section 107. The clean gas exits clean gas section 107 through outlet nozzle 103.

As a gas stream passes through gas filter 10, there is a pressure drop in the gas stream. The pressure drop of the gas within gas filter 10 is continuous as it flows through gas filter 10 and includes pressure drops occurring in regions A, B and C (FIG. 1A). The total pressure drop within filter vessel 101 may be measured by pressure gauges 11 and 12. In region A, there is a contraction pressure drop due to an increase in velocity as the gas stream travels into restricted space between cylindrical filter cartridges 104, depending on how close cylindrical filter cartridges 104 are packed in filter vessel 101. In region B, as the gas travels through filter medium 104a, there is another pressure drop, an inertial pressure drop. A further pressure drop occurs in region C as the gas travels through and expands from inside standpipe 105 into clean gas section 107 (expansion pressure drop). As discussed above, the amount of open space into which the gas flows in relation to the space from which it flows affects the pressure drops in regions A and C and the filter medium surface area affects the pressure drop in region B. Changing the diameter of the cylindrical filter cartridges in a filter vessel of fixed diameter may be used as a method to change the amount of open space into which the gas flows in relation to the space from which it flows. A change in the diameter and number of the cylindrical filter cartridges may also change the filter medium surface area. As such, a change in the diameter and number of the cylindrical filter cartridges may be used to establish the pressure drop in a gas filter.

It should be noted that changing the diameter of filter cartridges in a gas filter may include changing the number of filter cartridges that are disposed in the gas filter. For example, increasing the diameter of filter cartridges may require a reduction in the number of filter cartridges so that the filter cartridges can fit into the gas filter's filter vessel. Conversely, if the gas filter diameter is decreased, then, if desired, the gas filter's filter vessel may be able to hold a larger number of filter cartridges.

Figure 2:
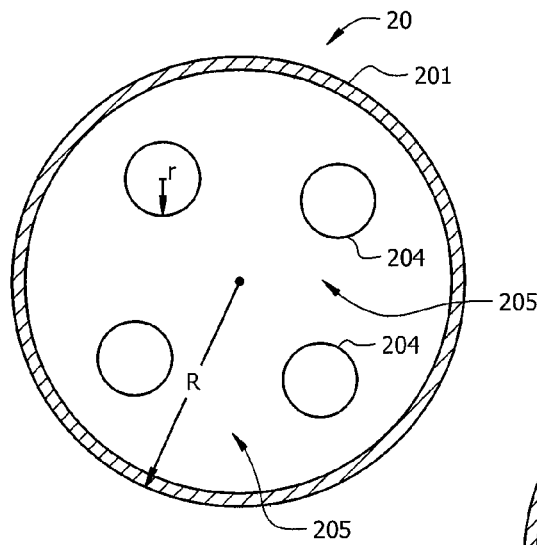
FIG. 2 is a diagram illustrating an existing multi cartridge gas filter.
Figure 3:
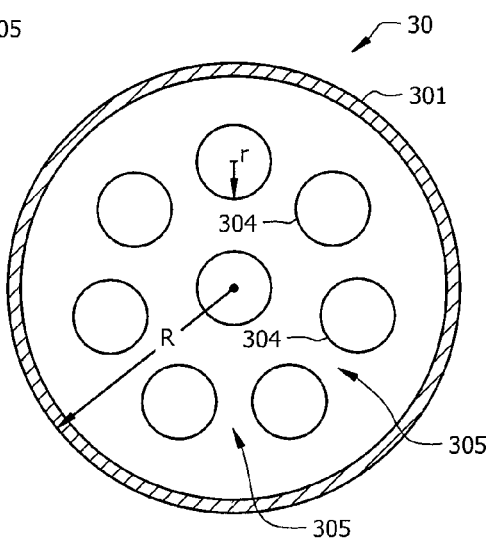
FIG. 3 is a diagram illustrating an existing multi cartridge gas filter.
Figure 4A:
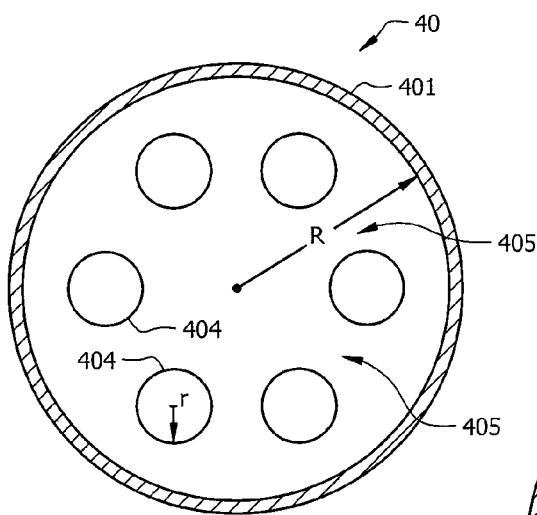
FIG. 4A-4B are diagrams illustrating existing multi cartridge gas filters.

FIGS. 2, 3 and 4A are diagrams that illustrate multi-cartridge gas filters 20, 30 and 40. Gas filters 20, 30 and 40 have filter vessels 201, 301 and 401, respectively. Filter vessels 201, 301 and 401 have the same dimensions. Four cylindrical filter cartridges 204 are disposed in filter vessel 201. Eight cylindrical filter cartridges 304 are disposed in filter vessel 301. Cylindrical filter cartridges 204 have the same dimensions as cylindrical filter cartridges 304. In particular, filter cartridges 204 and 304 have the same filter medium surface area. Because there are more filter cartridges in filter vessel 301 than in filter vessel 201, filter vessel 201 has more open space than filter vessel 301. That is, open space 205 is greater than open space 305.

Comparing gas filter 20 with gas filter 30, the contraction pressure drop as the gas travels between filter cartridges 204 and 304 will be greater in gas filter 30 because open space 305 is smaller than open space 205. Open space 205 has a volume of $\pi R^2 L - 4(\pi r^2)L$ while open space 305 has a volume of $\pi R^2 L - 8(\pi r^2)L$, where R is the radius of filter vessels 201 and 301, r is the radius of filter cartridges 204 and 304 and L is the length of filter cartridges 204 and 304 (see e.g., FIG. 4C, which shows filter cartridge 404 having the same dimensions as filter cartridges 204 and 304). The smaller the open space, the higher the velocity will be and, therefore, the contraction pressure drop in gas filter 30 will also be higher. The inertial pressure drop, as the gas passes through the filter medium, however, will be greater in gas filter 20 than gas filter 30 because gas filter 30 has twice as much filter medium surface area through which the gas passes. The filter medium surface area for gas filter 20 is $4(2\pi r)L$ and for gas filter 30 is $8(2\pi r)L$.

Figure 4B:
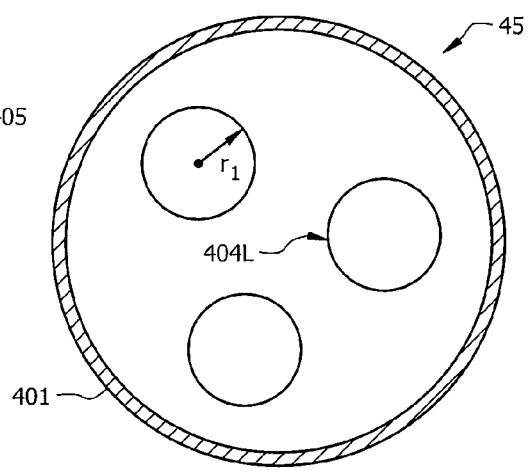

It should be noted that, though the surface area of filter cartridge 404 is stated as having the same surface area as cylindrical filter cartridges 204, i.e., a filter medium surface area of $2\pi rL$, the actual surface area of the filter medium may be larger than the outer surface area 408, as calculated using the formula $2\pi rL$. For example, FIG. 4D shows filter cartridge 404 having a filter medium of corrugated material 406. Thus, within the circumference of filter cartridge 404 the actual surface area of the filter medium with the corrugation is greater than the outer surface area 408. Similarly, FIG. 4E shows fibrous material 407. In some designs, the outer surface area of the filter cartridge is a mesh surface that provides structural support for filter materials such as corrugated material 406 and fibrous material 407. Additionally, there may also be an inner mesh that keeps the filter from collapsing in on itself. Therefore, it should be noted that reference to filter medium surface area as the outer surface area herein is for convenience of the reader. The actual filter medium's surface area will take into account the shape and material used as is known in the art.

Figure 4C:
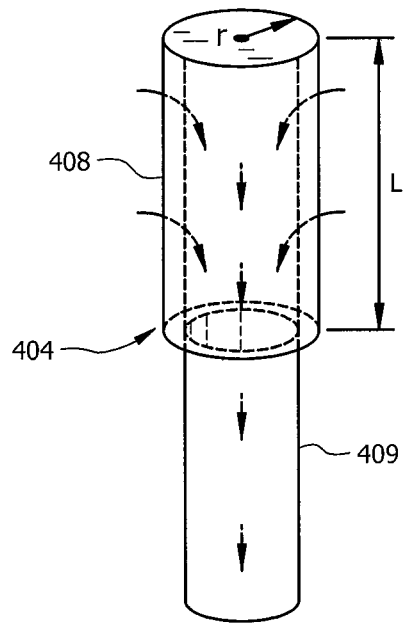
FIGS. 4C-4E are diagrams illustrating existing cylindrical filter cartridges.
Figure 4D:
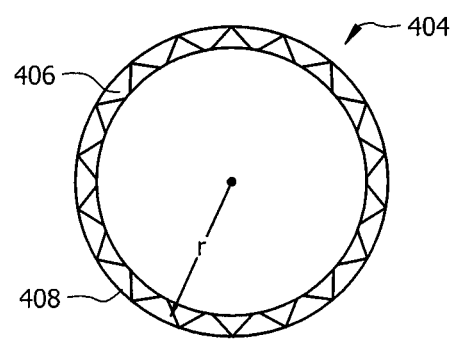
Figure 4E:
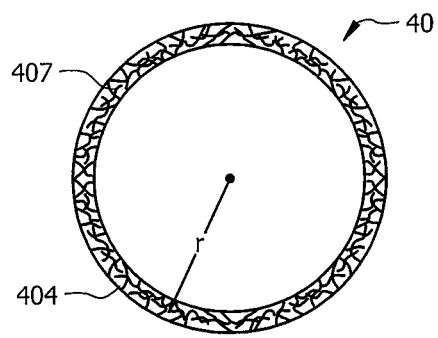

An expansion pressure drop occurs as the gas leaves filter cartridges 204 and 304 through standpipes (not shown in FIGS. 2 and 3 but a standpipe is shown as 409 in FIG. 4C)

back into filter vessels 201 and 301, respectively. As the gas flows thru standpipes the pressure drop is higher in gas filter 20 than in gas filter 30 because of a higher velocity due to a difference in open space in the vessels in relation to their corresponding standpipe opening areas. Because the total pressure drop across gas filters 20 and 30 includes the expansion, contraction and inertial pressures drops, on these facts alone, it is unclear which of gas filters 20 or 30 would provide the overall lower pressure drop. For this reason, tests or simulations would be carried out to determine which configuration of multi-cartridge gas filters provides the most appropriate pressure drop for their underlying systems. The optimization process may reveal that neither gas filter 20 nor gas filter 30 provides the least pressure drop for the vessel size and filter cartridge size in question.

FIG. 4A is a diagram illustrating a multi-cartridge gas filter 40 that represents an optimized gas filter having filter vessel 401, which has the same dimensions as filter vessels 201 and 301. Further, cylindrical filter cartridge 404 has the same dimensions as cylindrical filter cartridges 204 and 304. Gas filter 40, however, has six filters—the number of filters assumed, for illustrative purposes only, to have been determined to provide the optimal total pressure drop for the vessel and cylindrical cartridges being discussed. Because gas filter 40 provides the optimal pressure drop for the given filter vessel size and cylindrical cartridge size, gas filter 40 represents the optimal balance between the number of gas filter cartridges and open space. Thus, if the filter medium surface area is increased by increasing the number of filter cartridges and reducing the open space in the filter vessel, the increase in contraction pressure drop will be greater than the reduction in inertial and expansion pressure drops. If the filter medium surface area is decreased by decreasing the number of filter cartridges and increasing the open space in the filter vessel, the increase in inertial pressure drop and expansion pressure drop will be greater than the decrease in contraction pressure drop. This illustrates the limitations in further optimizing current gas filters.

In addition to varying the number of filter cartridges to determine the optimal number of filter cartridges, the diameter of the filter cartridges may be varied to achieve an optimal configuration. Varying the filter cartridge diameter may be done in addition to or as an alternative to varying the number of filter cartridges. FIG. 4B is a diagram illustrating a multi cartridge gas filter 45 that represents a gas filter optimized by varying the filter cartridge diameter and number of filter cartridges. Gas filter 45 includes filter vessel 401, which has the same dimensions as filter vessels 201 and 301. Cylindrical filter cartridge 404L, however, has a larger diameter than filter cartridges 204 and 304 ("$r_1$" is greater than "r"). Gas filter 45 has three filters—the number of filters assumed, for illustrative purposes only, to have been determined to provide the desired total pressure drop for filter vessel 401 having filter cartridges 404L. As such, similar to the discussion with respect to gas filter 40, further changes to the number of filter cartridges and/or diameter of filter cartridges would cause an increase in pressure drop across the filter vessel. In summary, the concepts described with respect to gas filters 40 and 45 as optimizations over gas filters 20 and 30 illustrate the limitations in further optimizing current gas filters.

Figure 5:
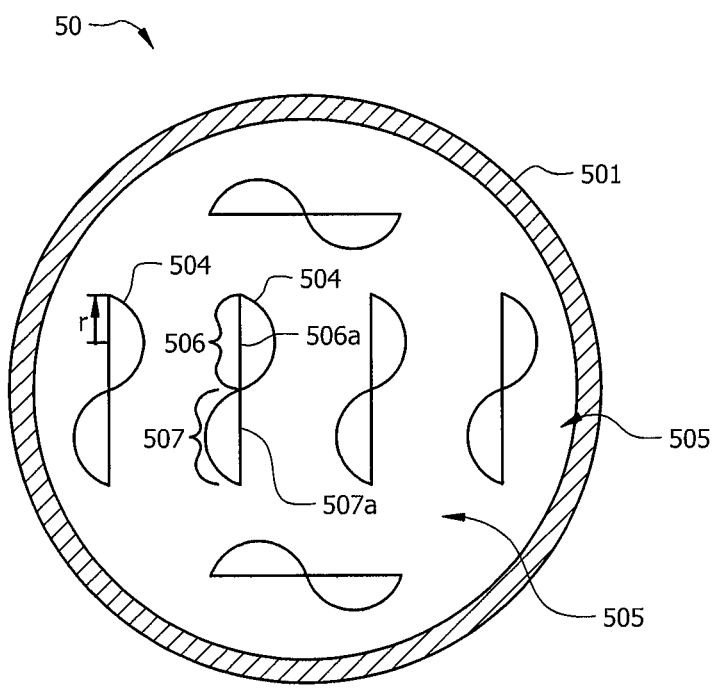
FIG. 5 is a diagram illustrating a multi cartridge gas filter according to one embodiment of the disclosure.

FIG. 5 is a diagram illustrating a multi-cartridge gas filter configured according to one embodiment of the disclosure directed to increasing the filter medium surface area without increasing the volume of space occupied by the filter cartridges within the gas filter's vessel. FIG. 5 shows filter vessel 501 having filter cartridges 504. Filter cartridges 504 instead of being cylindrical, include cylindrical segments 506 and 507. The filter cartridges of filter vessel 501, in effect, are a separation of filter cartridge 504 into two halves and adding additional surface areas 506a and 507a for each half cylinder. Additional surface areas 506a and 507a each have areas of 2rL.

Figure 6A:
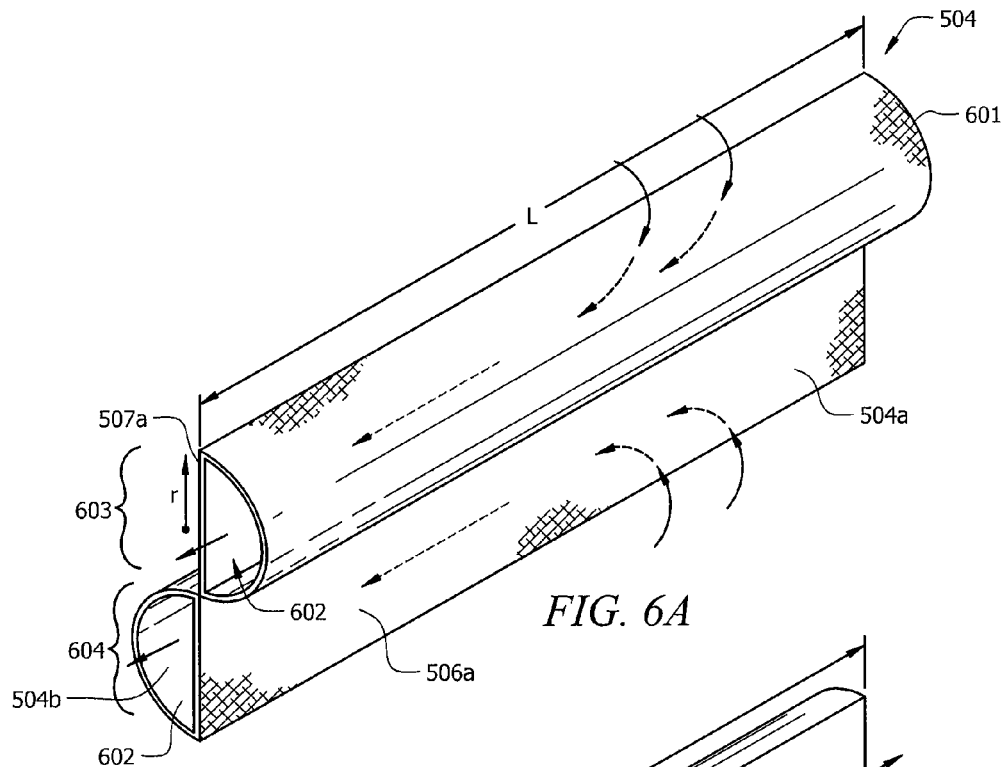
FIGS. 6A-6B are diagrams illustrating a filter cartridge according to one embodiment of the disclosure.
Figure 6B:
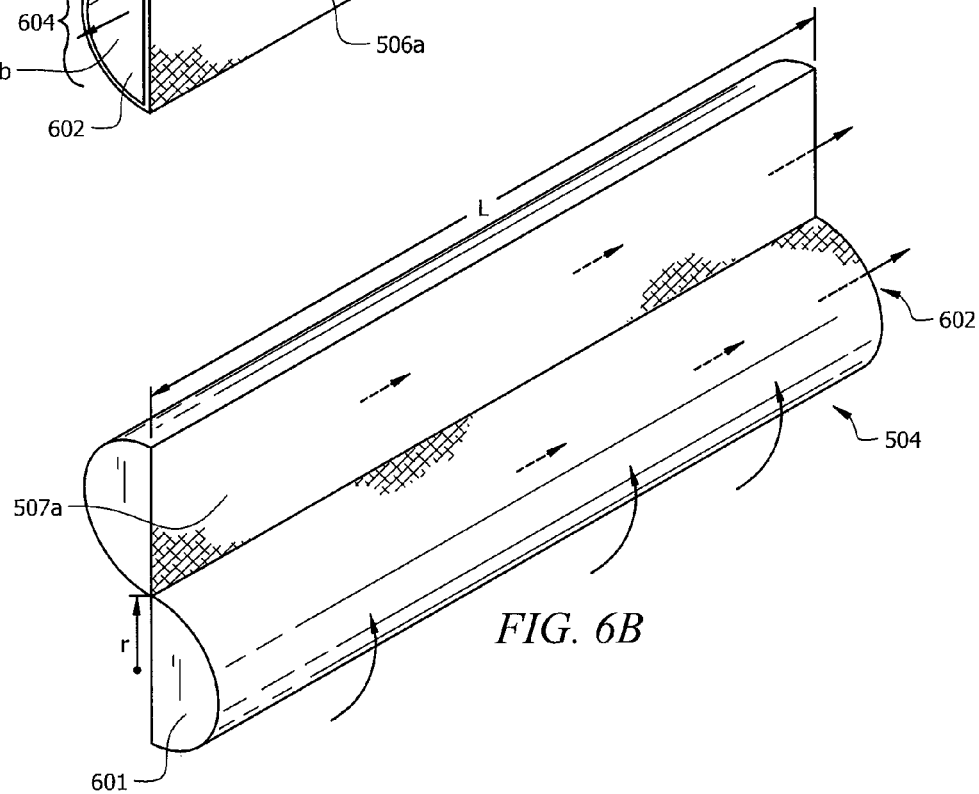

FIGS. 6A and 6B are diagrams illustrating filter cartridges 504 configured according to one embodiment of the disclosure. Filter cartridges 504 include a filter medium 504a. The body of filter cartridges 504 comprise filter medium 504a, which is made of porous material, such as woven cloth, felt or other porous membrane that allows gas to pass through but traps solids on its surface or within the material. Filter medium 504a encompasses a channel 504b, which is empty space through which the gas flows. End 601 of filter cartridge 504 is sealed while end 602 is open. End 602 may be fitted to a standpipe in a filter vessel. Therefore, gas that enters filter cartridge 504, through filter medium 504a, flows towards and exits end 602 (as shown by the arrows in FIGS. 6A and 6B). Filter cartridge 504 has a length L. Filter cartridge 504 includes two semi cylindrical sections 603 and 604, both having a radius r.

Comparing the filter medium surface areas of filter cartridges 404 with filter cartridges 504 shows the impact of the embodiments of the current disclosure. Filter cartridge 404 has a filter medium surface area of $2\pi rL$. Filter cartridge 504 has a filter medium surface area of $2\pi rL+4rL$ as a consequence of additional surface areas 506a and 507a. Filter cartridges 504 represent a 63% increase in filter media surface area over the filter medium surface area of filter cartridges 404. Significantly, open space 505 is equal to open space 405 because filter cartridges 504 and filter cartridges 404 occupy the same volume of space within filter vessels 501 and 401, respectively. That is, in moving from the configuration of gas filter 40 to the configuration of gas filter 50, there has been no decrease or increase in open space even though the filter medium surface area has been increased substantially.

Figure 7:
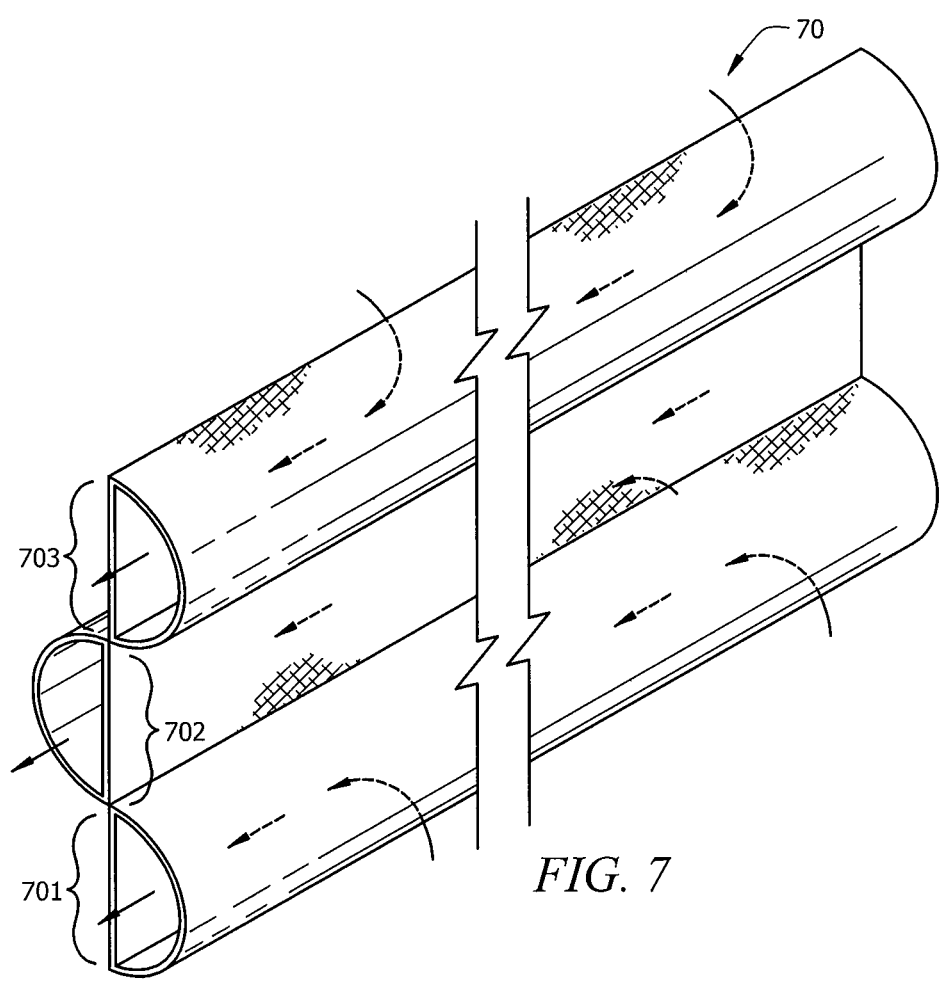
FIG. 7 is a diagram illustrating a filter cartridge according to one embodiment of the disclosure.

FIG. 7 is a diagram illustrating filter cartridge 70 configured according to one embodiment of the present disclosure. Filter cartridge 70 has three cylindrical segments 701, 702 and 703. The total surface area of filter medium associated with filter cartridge 70 is $3(\pi rL+2rL)$. FIGS. 6A, 6B and 7 illustrate that in various embodiments of the present disclosure, each filter cartridge may be two or more semi-cylindrical segments joined to form one cartridge. Indeed, a cartridge could just be a single semi-cylindrical shape. It should be noted that, though a right circular cylinder segment is shown, this disclosure may encompass any cylindrical-like segment shape including: an elliptic cylinder segment, parabolic cylinder segment, or hyperbolic cylinder segment, or the like.

Figure 8:
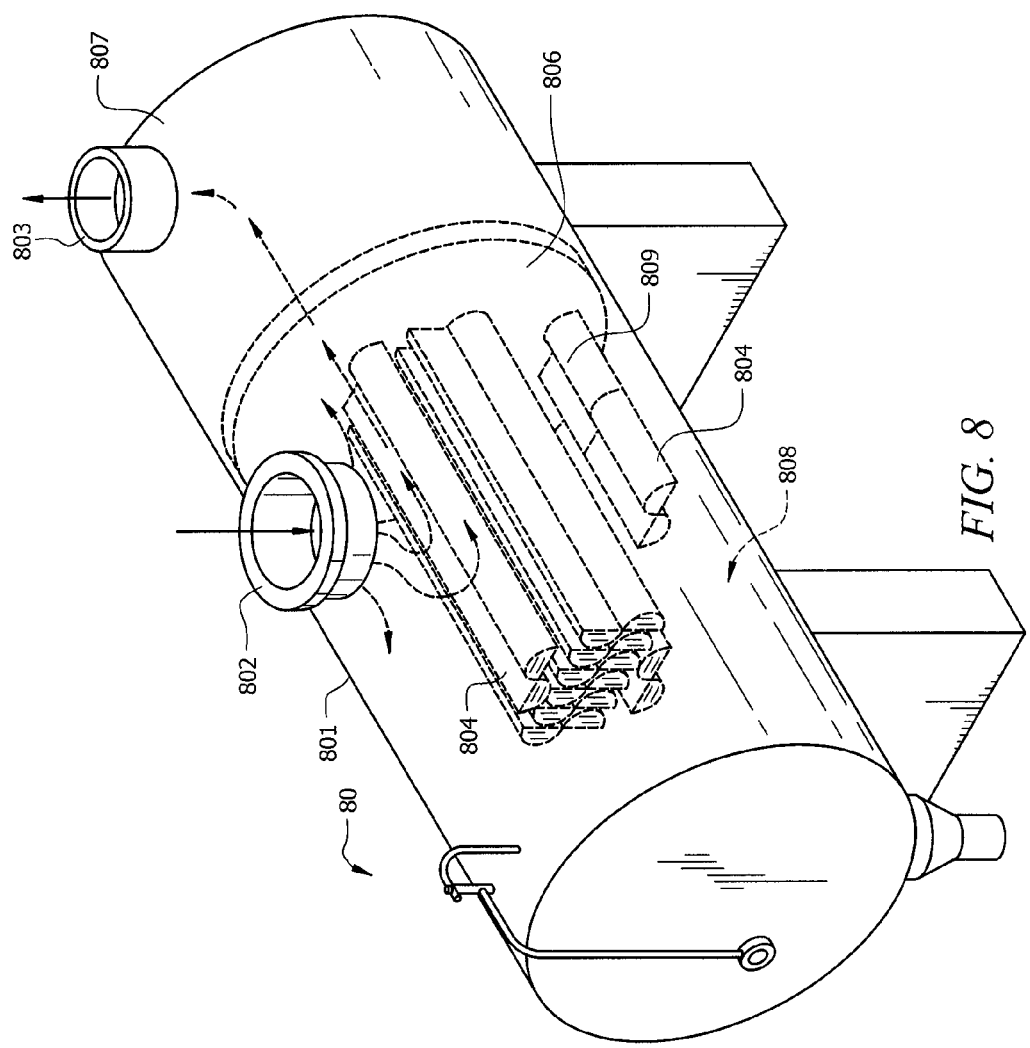
FIG. 8 is a diagram illustrating a gas filter according to one embodiment of the disclosure.

FIG. 8 is a diagram illustrating a gas filter 80 configured according to one embodiment of the disclosure. Gas filter 80 includes filter vessel 801 and filter cartridges 804 disposed in filter vessel 801. Plate 806 separates filter vessel 801 into clean gas section 807 and dirty gas section 808. Plate 806 includes open areas shaped to receive filter cartridge 804. In some embodiments of the disclosure, plate 806 has holes shaped to receive standpipes that provide fluid communication between a filter cartridge and clean gas section 807. Dirty gas section 808 contains dirty gas received through inlet 802 and clean gas section 807 contains clean gas that exits filter cartridge 804. The clean gas flows from clean gas section 807 and exits filter vessel 801 through outlet nozzle 803. The arrows in FIG. 8 show an example flow path of gas that is filtered by gas filter 80. Filter cartridge 804 is similar to filter cartridge 504 and provides significant filter medium surface area over traditional filter cartridges without utilizing additional open space of filter vessel 801 as would be the case if traditional cylindrical cartridges were used to increase the filter medium surface area.

Figure 9:
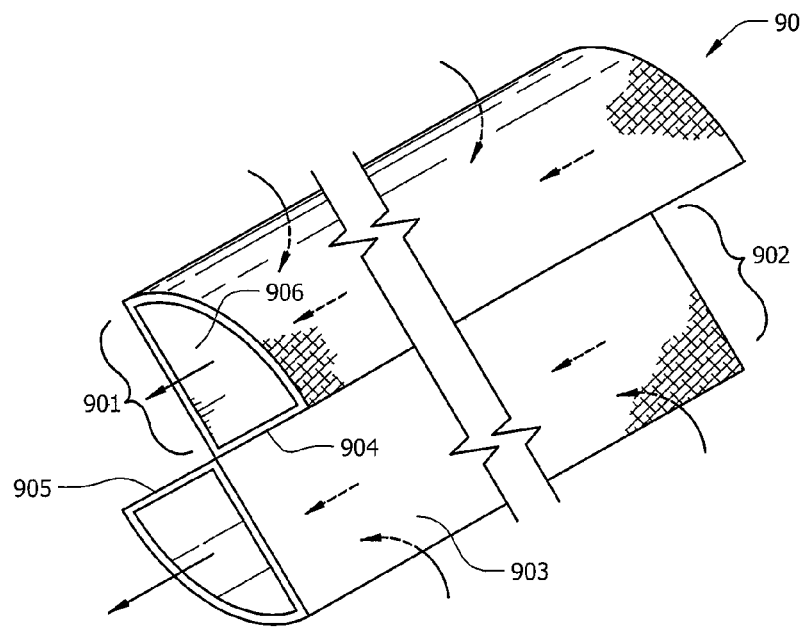
FIG. 9 is a diagram illustrating a filter cartridge according to one embodiment of the disclosure.

FIG. 9 is a diagram illustrating a filter cartridge 90 configured for use in a gas filter according to one embodiment of the present disclosure. Filter cartridge 90 comprises sections 901 and 902, which have cylindrical segment shapes. Each of sections 901 and 902 may be about one quarter segment of a cylinder. Significantly, filter cartridge 90 includes additional surface areas 903, 904, 905 and 906, which would not be present in a cylindrical cartridge with a diameter equivalent to the diameter of filter cartridge 90. Moreover, the surface area lost from the curved area of the cylindrical filter cartridge is less than the total surface area gained by additional surface areas 903, 904, 905 and 906.

Various embodiments of the disclosure may involve the retrofitting of gas filters that contain traditionally shaped filter cartridges, such as cylindrical filter cartridges, in order to increase filtration medium surface area. An increase in filter medium surface area is significant in the art because the larger the filter medium surface area the more efficient particulate matter removal will be and the longer the filter cartridge life will be. With longer filter cartridge life, there is less downtime for replacement of filter cartridges. Reducing downtime in many industries is a significant cost saving item. In embodiments of the disclosure, this increase in filtration medium surface area does not increase the overall pressure drop. Indeed, the retrofitting process may decrease the total pressure drop across the gas filter. The method involves the use of filter cartridges, such as filter cartridges 504, 804, 70 and 90 to replace, for example, cylindrical filter cartridges. The volume of the replaced filter cartridges (e.g. filter cartridges 404) will be the same or similar to the volume occupied by new filter cartridges (e.g. filter cartridges 504 and 90) so that the open space in the filter vessel before and after retrofitting is essentially the same or similar. Because there is negligible change in the open space and the filter medium surface area is increased, the total pressure drop across the gas filter would not increase and could even decrease. The retrofitting process may begin by opening the gas filter to remove the cylindrical filter cartridges. Procedures to open the gas filters may be similar to current procedures for replacing filter cartridges when they get dirty.

Because the gas filter will be fitted with differently shaped cartridges, however, embodiments of the disclosure include making adaptations to the gas filter vessel so that the new filter cartridges may be secured in the filter vessel. For example, assuming gas filter 80 is the product of the retrofitting being described herein, then prior to filter cartridges 804 being fitted, plate 806 would have to be changed or modified to have holes with the same shape as the ends of filter cartridges 804. In embodiments of the disclosure where a standpipe 809 is positioned in plate 806 for providing fluid communication between filter cartridge 804 and clean gas section 807, the standpipe 809 would be modified to accommodate the shape of filter cartridge 804 instead of, for example, a cylindrical filter cartridge. Alternatively, plate 806 and standpipe 809 may be completely replaced. Once the cylindrical cartridges are removed and adaptations are made to receive filter cartridges with the new shapes, then the new filter cartridges, such as filter cartridges 504, 804, 70 and 90 are fitted to plate 806 or standpipe 809.

Embodiments of the disclosure may involve the retrofitting of gas filters that contain traditionally shaped filters, such as cylindrical filters, in order to reduce pressure drop. There may be instances in an existing industrial process where the pressure drop across a gas filter is too high. Instead of pursuing the expensive option of replacing the entire gas filter, embodiments of the disclosure may be implemented to reduce the pressure drop across the filter without sacrificing the filtration capacity of the filter. Specifically, filter cartridges according to embodiments of the disclosure may be used to replace traditional filter cartridges such as cylindrical filter cartridges. To reduce the pressure drop across the filter, the gas filter is retrofitted to use filter cartridges occupying less space than the filter cartridges prior to the retrofitting. This may be done while maintaining the gas filter's filtration capacity by using filter cartridges 504, 804, 70 and 90. Filter cartridges 504, 804, 70 and 90 provide more filtration surface area than, for example, filter cartridge 404 even though it has essentially the same volume displacement as filter cartridges 504 and 804. Consequently, fewer filter cartridges 504 and 804 may be used to maintain the filtration capacity of the gas filter. The steps of opening the gas filter and removing the traditional filter cartridges are similar to those disclosed above with respect to retrofitting to increase filter medium surface area.

Figure 10:
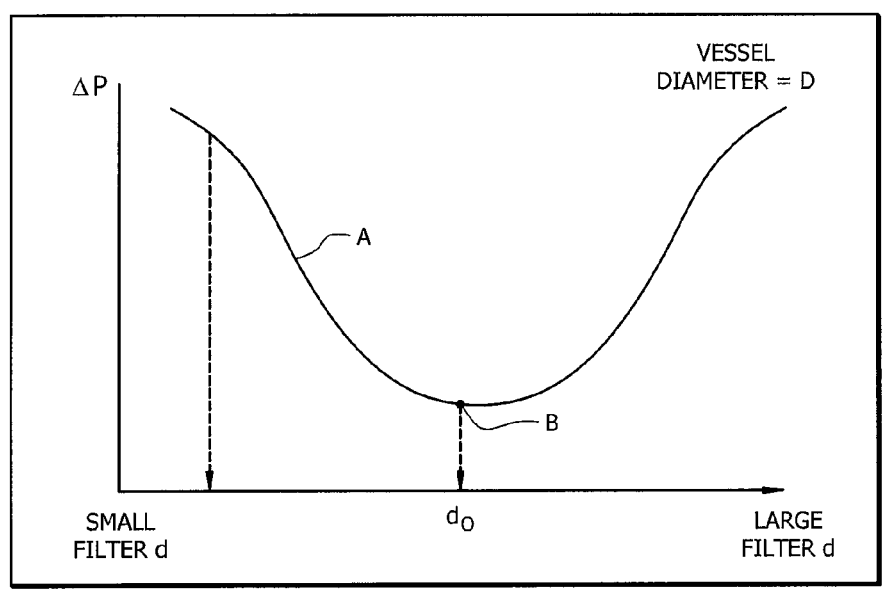
FIG. 10 shows a graph produced from data gathered in a gas filter optimization process.
Figure 11:
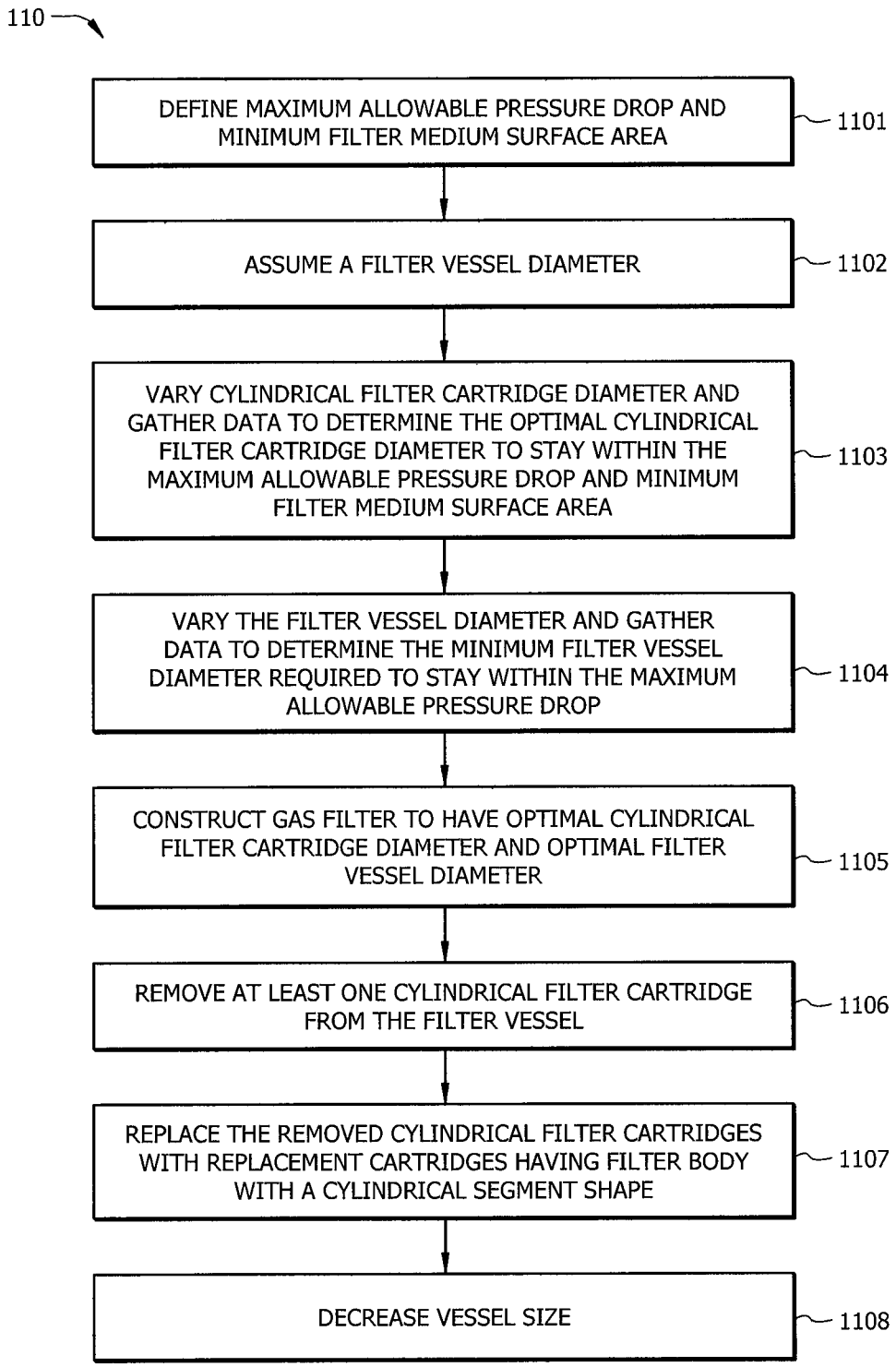
FIG. 11 shows a procedure according to one embodiment of the disclosure.

FIG. 11 shows procedure 110 according to one embodiment of the disclosure that optimizes the filter cartridge diameter and filter vessel diameter to achieve an optimized pressure drop and then further reducing the vessel size of the gas filter vessel without exceeding the maximum allowed pressure drop. Procedure 110 includes an end user defining the maximum allowable pressure drop and minimum filter medium surface area, in process 1101. Process 1102 involves assuming a filter vessel diameter that is to be used in the initial optimization process. For the assumed filter vessel diameter, in process 1103, the cylindrical filter cartridge diameter is varied and simulations or tests run to gather enough data that establishes the optimal cylindrical filter cartridge diameter to stay within the maximum allowable pressure drop and minimum filter medium surface area (e.g., plotting graph such as that shown in FIG. 10).

This optimal cylindrical filter cartridge diameter is based on the assumed filter vessel diameter. As such, in process 1104, the filter vessel diameter is varied and simulations or tests are run to gather enough data to determine the minimum vessel diameter to stay within the maximum allowable pressure drop. At this point, the vessel may be constructed, in process 1105, to have the optimal cylindrical filter cartridge diameter, and optimal filter vessel diameter. In process 1106, at least one cylindrical filter cartridge is removed from the filter vessel. Process 1106 may also involve the removal of the apparatus (plate or tube sheet) that is configured to receive the cylindrical filter cartridge in the filter vessel. In process 1107, the removed cylindrical filter cartridge is replaced with a replacement filter cartridge having filter body with a cylindrical segment shape and may also include replacing the removed plate or tube sheet with a new plate or tube sheet configured to receive a replacement filter cartridge having filter body with a cylindrical segment shape.

Replacing the cylindrical cartridge in the filter vessel with a filter cartridge having a filter body with a cylindrical segment shape has the effect of decreasing the pressure drop of the gas filter. Consequently, in process 1108 the filter vessel size can be reduced and, at the same time, meet the specified maximum allowable pressure drop. It should be noted that embodiments of the disclosure may include some or all of processes 1101 to 1108. For example, one embodiment of the disclosure may involve only processes 1106 to 1108.

Figure 12:
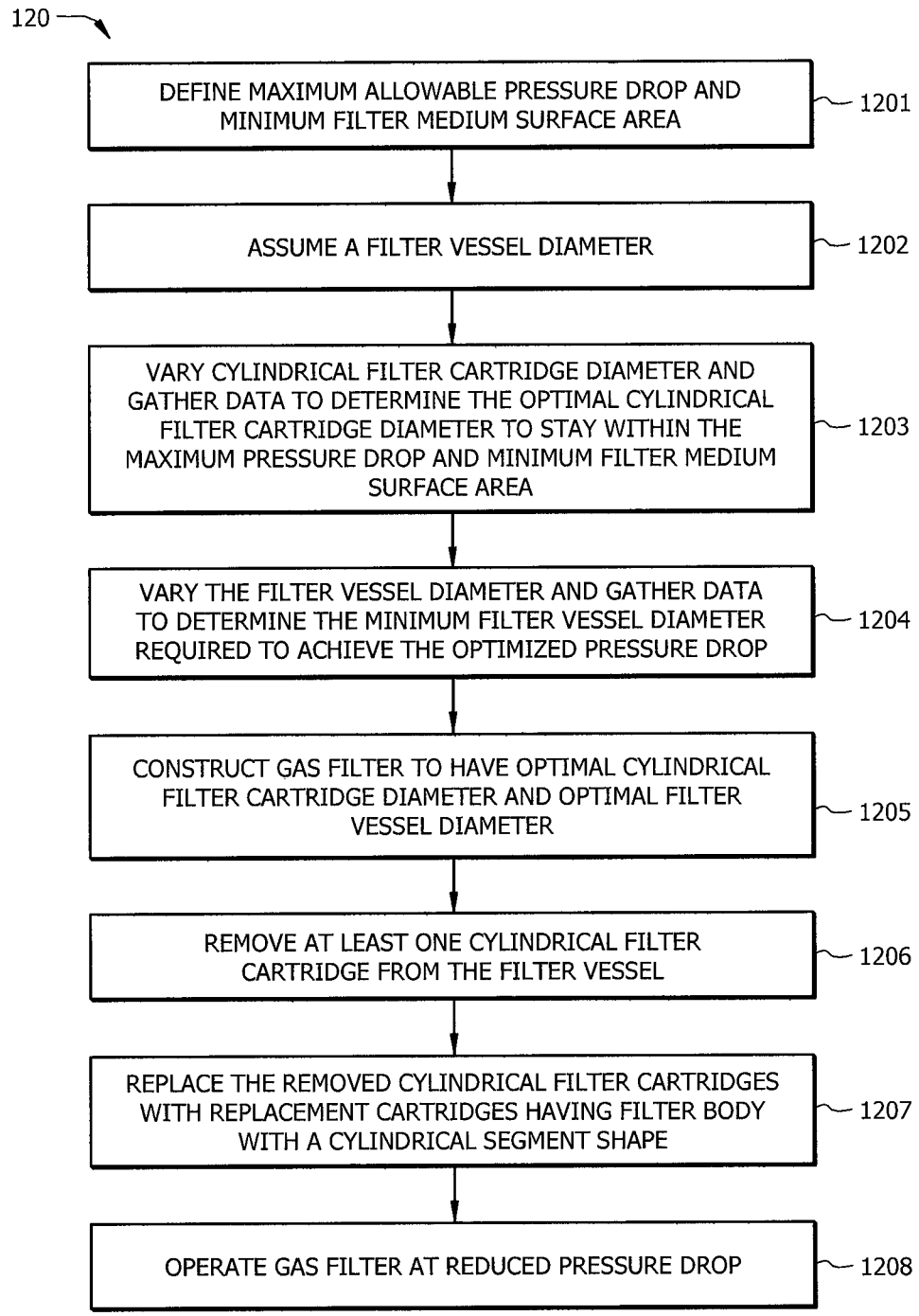
FIG. 12 shows a procedure according to one embodiment of the disclosure.

FIG. 12 shows procedure 120 according to one embodiment of the disclosure that optimizes the filter cartridge diameter and filter vessel diameter to achieve an optimized pressure drop and then reducing the pressure drop below the optimized level without increasing the filter vessel size. Procedure 120 includes an end user defining the maximum allowable pressure drop and minimum filter medium surface area, in process 1201. Process 1202 involves assuming a filter vessel diameter that is to be used in the initial optimization process. For the assumed filter vessel diameter, in process 1203, the cylindrical filter cartridge diameter is varied and simulations or tests run to gather enough data that establishes the optimal cylindrical filter cartridge diameter to stay within the maximum allowable pressure drop and minimum filter medium surface area (e.g., plotting graph such as that shown in FIG. 10).

This optimal cylindrical filter cartridge diameter is based on the assumed filter vessel diameter. As such, in process 1204, the filter vessel diameter is varied and simulations or tests are run to gather enough data to determine the minimum vessel diameter required to achieve the optimized pressure drop. At this point, the vessel may be constructed, in process 1205, to have the optimal cylindrical filter cartridge diameter and optimal filter vessel diameter. In process 1206, at least one cylindrical filter cartridge is removed from the filter vessel. Process 1206 may also involve the removal of the apparatus (plate or tube sheet) that is configured to receive the cylindrical filter cartridge in the filter vessel. In process 1207, the removed cylindrical filter cartridge is replaced with a replacement filter cartridge having a filter body with a cylindrical segment shape and may also include replacing the removed plate or tube sheet with a new plate or tube sheet configured to receive a replacement filter cartridge having the cylindrical segment shape.

Replacing the cylindrical cartridge in the filter vessel with a filter cartridge having the cylindrical segment shape has the effect of decreasing the pressure drop of the gas filter from the previous optimized pressure drop. Consequently, in process 1208, the gas filter vessel may be operated at a reduced pressure drop. It should be noted that embodiments of the disclosure may include some or all of processes 1201 to 1208. For example, one embodiment of the disclosure may involve only processes 1206 to 1208.

Methods for designing gas filters that involve performing calculations and simulations to achieve a desired pressure drop in view of the size of the gas filter, the diameter and number of filter cartridges are known in the art. Examples of design and optimization processes are disclosed in Mac Buzanowski et al., "Optimization of Multi Cylindrical Filters for Industrial Gas Processing Plants, Proceedings of the $5^{th}$ Joint ASME/JSME Fluids Engineering Conference, Jul. 30-Aug. 2, 2007, San Diego, Calif., and in Mac Buzanowski et al., "Minimizing the Pressure Drop Across Filters with Multi Cylindrical Filter Tubes," American Filtration and Separation Society Annual Conference, Filter Modeling Session, Mar. 26-29, 2007, Orlando, Fla., the disclosures of which are incorporated in their entirety by reference and which are submitted in an Information Disclosure Statement filed concurrently herewith. Various embodiments of the disclosure include these methods to design gas filters to achieve a desired pressure drop and also include factoring in parameters of a filter cartridge configured according to the present disclosure, such as filter cartridges 504, 804 and 90. Designing gas filters using filter cartridges having configurations according to the present disclosure provides the benefit of reducing the cost of the gas filters over prior art configurations. Specifically, designing gas filters with filter cartridges of the current disclosure allows smaller vessel sizes to be designed for a desired pressure drop and filter cartridge diameter. It should be noted that though the embodiments discussed herein involve gas operations and filtration of gas (which is a fluid), the techniques and filter designs disclosed herein are applicable to any type of fluid filtration, such as the filtration of liquids.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A filter cartridge comprising:
   a filter body comprising two semi-cylindrical shapes, each of said semi-cylindrical shapes comprises a cross sectional area having a perimeter defined by a curve intersecting a straight line, wherein said filter body has a filter surface area that includes curved sections and flat, quadrilateral sections of said semi-cylindrical shapes such that a total surface area of said curved sections is greater than a total surface area of said flat sections; and
   two channels disposed within said filter body for receiving fluid filtered through said filter body.

2. The filter cartridge of claim 1 further comprising:
   an open end; and
   a closed end.

3. The filter cartridge of claim 1 wherein said filter body comprises:
   woven cloth, felt or porous membrane.

4. A filter comprising:
   a vessel having an inlet nozzle and an outlet nozzle; and
   a plurality of filter cartridges disposed within said vessel and in fluid communication with said inlet nozzle and outlet nozzle, wherein at least one of said filter cartridges comprises:
   a filter body comprising two semi-cylindrical shapes, each of said semi-cylindrical shapes comprises a cross sectional area having a perimeter defined by a curve intersecting a straight line, wherein said filter body has a filter surface area that includes curved sections and flat, quadrilateral sections of said semi-cylindrical shapes such that a total surface area of said curved sections is greater than a total surface area of said flat sections; and
   two channels disposed within said filter body for receiving fluid filtered through said filter body.

5. The filter of claim 4 further comprising:
   a plate for receiving said plurality of said filter cartridges within said vessel and dividing said vessel into a clean fluid section and a dirty fluid section.

6. The filter of claim 4 further comprising:
   a standpipe associated with each one of said plurality of filter cartridge.

7. A method for increasing filter surface area of a filter that has a plurality of filter cartridges disposed in a vessel, said method comprising:

removing at least one filter cartridge of said plurality of filter cartridges;

replacing said at least one filter cartridge with at least one replacement cartridge wherein said at least one replacement cartridge maintains a same volume of said at least one filter cartridge within said vessel and increases a filter surface area over said at least one filter cartridge;

wherein said removed filter cartridge is cylindrical and has a length L and radius r; and wherein said replacement filter cartridge comprises:

a filter body comprising two semi-cylindrical shapes, each of said semi-cylindrical shapes comprises a cross sectional area having a perimeter defined by a curve intersecting a straight line, wherein said semi-cylindrical shapes have a length L and radius r and said filter body has a filter surface area that includes surface areas of curved sections and flat, quadrilateral sections of said semi-cylindrical shapes such that a total surface area of said filter body is greater than the total surface area of said removed filter cartridge; and two channels disposed within said filter body for receiving fluid filtered through said filter body.

8. A method of increasing a filter medium surface area of a filter that has a plurality of filter cartridges disposed in a vessel, said method comprising:

removing at least one filter cartridge from said vessel; and replacing said at least one filter cartridge with a filter cartridge that comprises:

a filter body comprising two semi-cylindrical shapes, each of said semi-cylindrical shapes comprises a cross sectional area having a perimeter defined by a curve intersecting a straight line, wherein said semi-cylindrical shapes have a length L and radius r and said filter body has a filter surface area that includes surface areas of curved sections and flat, quadrilateral sections of said semi-cylindrical shapes such that a total surface area of said filter body is greater than the total surface area of a cylindrical cartridge having length L and radius r, wherein said filter body and said cylindrical cartridge occupies a same volume of space; and two channels disposed within said filter body for receiving fluid filtered through said filter body.

9. A method of increasing a filter medium surface area of a filter that has a plurality of cylindrical filter cartridges disposed in a vessel, said method comprising:

removing at least one cylindrical filter cartridge from said filter, wherein said at least removed filter cartridge has a length L and radius r;

replacing said at least one removed cylindrical filter cartridge with a filter cartridge that comprises:

a filter body comprising two semi-cylindrical shapes, each of said semi-cylindrical shapes comprises a cross sectional area having a perimeter defined by a curve intersecting a straight line, wherein said semi-cylindrical shapes have a length L and radius r and said filter body has a filter surface area that includes surface areas of curved sections and flat, quadrilateral sections of said semi-cylindrical shapes such that a total surface area of said filter body is greater than the total surface area of said at least one removed cylindrical filter cartridge, wherein said filter body and said at least one removed cylindrical filter cartridge occupies a same volume of space; and two channels disposed within said filter body for receiving fluid filtered through said filter body.

10. The method of claim 9 further comprising:

removing apparatus for receiving said at least one cylindrical filter cartridge; and replacing said apparatus for receiving said at least one cylindrical filter cartridge with apparatus configured to receive said filter cartridge having filter body with semi-cylindrical shapes.

11. The method of claim 9 further comprising:

adjusting said apparatus for receiving said at least one cylindrical filter cartridge to receive said filter cartridge having filter body with semi-cylindrical shapes.

12. The method of claim 11 wherein said apparatus for receiving said at least one cylindrical filter cartridge is selected from the list consisting of a plate with orifices and a standpipe.

13. A method of reducing a total pressure drop across a filter that has a plurality of filter cartridges disposed in a vessel, said method comprising:

removing at least one filter cartridge from said vessel; and replacing said at least one removed filter cartridge with a filter cartridge that comprises:

a filter body comprising two semi-cylindrical shapes, each of said semi-cylindrical shapes comprises a cross sectional area having a perimeter defined by a curve intersecting a straight line, wherein said semi-cylindrical shapes have a length L and radius r and said filter body has a filter surface area that includes surface areas of curved sections and flat, quadrilateral sections of said semi-cylindrical shapes such that a total surface area of said filter body is greater than the total surface area of a cylindrical cartridge having length L and radius r, wherein said filter body and said cylindrical cartridge occupies a same volume of space; and two channels disposed within said filter body for receiving fluid filtered through said filter body.

14. A method of reducing a total pressure drop across a filter that has a plurality of cylindrical filter cartridges disposed in a vessel, said method comprising:

removing at least one cylindrical filter cartridge from said filter, wherein said at least one removed cylindrical filter cartridge has a length L and radius r;

replacing said at least one removed cylindrical filter cartridge with a filter cartridge that comprises:

a filter body comprising two semi-cylindrical shapes, each of said semi-cylindrical shapes comprises a cross sectional area having a perimeter defined by a curve intersecting a straight line, wherein said semi-cylindrical shapes have a length L and radius r and said filter body has a filter surface area that includes surface areas of curved sections and flat, quadrilateral sections of said semi-cylindrical shapes such that a total surface area of said filter body is greater than the total surface area of said at least one removed cylinder filter cartridge, wherein said filter body and said at least one removed cylindrical filter cartridge occupies a same volume of space; and two channels disposed within said filter body for receiving fluid filtered through said filter body.

15. The method of claim 14 further comprising:

removing apparatus for receiving said at least one cylindrical filter cartridge; and replacing said apparatus for receiving said at least one cylindrical filter cartridge with apparatus configured to receive said filter cartridge having filter body with a semi-cylindrical shape.

16. The method of claim 14 further comprising:
reducing said vessel's diameter.

17. A method of designing a filter, said method comprising:
performing an initial optimization process by varying a cylindrical filter cartridge diameter and gathering data that establishes an optimal cylindrical filter cartridge diameter to stay within a maximum allowable pressure drop;
varying a filter vessel's diameter and gathering data to determine a minimum filter vessel diameter required to achieve an optimized pressure drop;
constructing said filter to have said optimal cylindrical filter cartridge diameter, and said optimal filter vessel diameter;
removing at least one cylindrical filter cartridge from said filter vessel, wherein said at least one removed cylindrical filter cartridge has a length L and radius r; and
replacing said at least one removed cylindrical filter cartridge in said filter vessel with a filter cartridge comprising two semi-cylindrical shapes, said each of said semi-cylindrical shapes comprises a cross sectional area having a perimeter defined by a curve intersecting a straight line, wherein said semi-cylindrical shapes have a length L and radius r and said filter body has a filter surface area that includes surface areas of curved sections and flat, quadrilateral sections of said semi-cylindrical shapes such that a total surface area of said filter body is greater than the total surface area of said at least one removed cylindrical filter cartridge, wherein said filter body and said at least one removed cylindrical filter cartridge occupies a same volume of space.

18. The method of claim 17 further comprising:
operating said filter at a pressure drop lower than said optimized pressure drop.

19. The method of claim 18 further comprising:
decreasing said filter vessel size.

20. The method of claim 19 wherein said optimal cylindrical filter cartridge diameter comprises at least a minimum filter medium surface area designated for said filter.

* * * * *